(12) United States Patent
Kiribayashi

(10) Patent No.: US 8,700,266 B2
(45) Date of Patent: Apr. 15, 2014

(54) DATA RECORDING APPARATUS FOR VEHICLE

(75) Inventor: Shinichi Kiribayashi, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/613,682

(22) Filed: Sep. 13, 2012

(65) Prior Publication Data

US 2013/0110354 A1    May 2, 2013

(30) Foreign Application Priority Data

Oct. 31, 2011    (JP) ................................ 2011-238271

(51) Int. Cl.
*B60R 22/00*    (2006.01)
*G01M 17/00*    (2006.01)
*H04N 7/18*    (2006.01)

(52) U.S. Cl.
USPC ............................. 701/45; 701/33.4; 348/148

(58) Field of Classification Search
USPC ............................. 701/45, 37, 33.4; 348/148
See application file for complete search history.

(56) References Cited

U.S. PATENT DOCUMENTS

| | | | | |
|---|---|---|---|---|
| 6,122,959 | A * | 9/2000 | Hoshal et al. ................... | 73/489 |
| 7,266,433 | B2 * | 9/2007 | Ozawa ......................... | 701/33.4 |
| 7,359,821 | B1 * | 4/2008 | Smith et al. .................. | 702/113 |
| 7,499,781 | B2 * | 3/2009 | Hermann ....................... | 701/45 |
| 7,536,457 | B2 * | 5/2009 | Miller .......................... | 709/224 |
| 7,881,842 | B2 * | 2/2011 | Kuttenberger et al. ......... | 701/45 |
| 2005/0192727 | A1 * | 9/2005 | Shostak et al. ................. | 701/37 |
| 2007/0032930 | A1 * | 2/2007 | Ozawa ........................... | 701/35 |
| 2008/0071446 | A1 * | 3/2008 | Brauner et al. ................. | 701/45 |
| 2008/0201042 | A1 * | 8/2008 | Cuddihy et al. ............... | 701/45 |
| 2009/0248241 | A1 * | 10/2009 | Ishii et al. ...................... | 701/35 |
| 2010/0030433 | A1 * | 2/2010 | Suzuki ........................... | 701/45 |
| 2010/0123779 | A1 * | 5/2010 | Snyder et al. ................. | 348/148 |

FOREIGN PATENT DOCUMENTS

| | | |
|---|---|---|
| JP | 08-282430 | 10/1996 |
| JP | 09-062885 | 3/1997 |
| JP | 09-218219 | 8/1997 |
| JP | 2007-045221 | 2/2007 |

OTHER PUBLICATIONS

Office action dated Sep. 17, 2013 in corresponding Japanese Application No. 2011-238271.

* cited by examiner

*Primary Examiner* — Thomas Black
*Assistant Examiner* — Tyler Paige
(74) *Attorney, Agent, or Firm* — Harness, Dickey & Pierce, PLC

(57) ABSTRACT

A data recording apparatus for a vehicle equipped with an occupant protection device includes main and safing sensors for detecting acceleration of the vehicle, a temporary memory section for storing main and safing calculation values respectively calculated from detection results of the main and safing sensors, a control section for controlling the occupant protection device based on the main and safing calculation values and for determining whether a predetermined condition associated with the acceleration is satisfied, and a recording section for recording the main calculation value upon determination of the control section that the condition is satisfied. The recording section records the main calculation value for a first period before the determination and records the main calculation value for a second period after the determination. The recording section further records the safing calculation value for the second period.

9 Claims, 3 Drawing Sheets

DATA RECORDING APPARATUS FOR VEHICLE

CROSS-REFERENCE TO RELATED APPLICATION

This application is based on Japanese Patent Application No. 2011-238271 filed on Oct. 31, 2011, the disclosure of which is incorporated herein by reference.

TECHNICAL FIELD

The present disclosure relates to a data recording apparatus for recording vehicle data such as acceleration of a vehicle in the event of a crash.

BACKGROUND

Recently, there have been an increased number of vehicles equipped with a data recording apparatus, which is sometimes referred to as an event data recorder (EDR). When a predetermined condition, for example, for activation of an occupant protection device (e.g., airbag) is satisfied in an accident of a vehicle such as a crash, the data recording apparatus records vehicle information (e.g., acceleration) for a predetermined period before and after the condition is satisfied. The recorded information is used for an investigation of the accident.

U.S. 2007/0032930A corresponding to JP-A-2007-45221 discloses such a data recording apparatus. In a vehicle equipped with an occupant protection device, it is necessary to detect acceleration information of the vehicle to activate the occupant protection device. In order to provide redundancy for activation of the occupant protection device, i.e., in order to accurately activate the occupant protection device, the acceleration information is detected by using two sensors, a main sensor and a safing sensor. A controller for controlling activation of the occupant protection device determines whether the condition for activation of the occupant protection device is satisfied based on both the acceleration information detected by the main sensor and the acceleration information detected by the safing sensor.

In the conventional data recording apparatus, the information recorded for the period before and after the condition is satisfied is derived from only the acceleration information detected by the main sensor. Since the recorded information contains acceleration information detected after the accident, it is difficult to determine whether the recorded information is accurate.

SUMMARY

In view of the above, it is an object of the present disclosure to provide a vehicle data recording apparatus for easily checking reliability of recorded acceleration information.

According to an aspect of the present disclosure, a data recording apparatus for a vehicle equipped with an occupant protection device includes a main sensor, a safing sensor, a temporary memory section, a control section, and a recording section. The main sensor detects acceleration of the vehicle in event of a crash. The safing sensor detects the acceleration. The temporary memory section stores a main calculation value and a safing calculation value for a predetermined period. The main calculation value is calculated from a detection result of the main sensor. The safing calculation value is calculated from a detection result of the safing sensor. The control section controls activation and deactivation of the occupant protection device based on the main calculation value and the safing calculation value. The control section determines whether a predetermined condition associated with the acceleration is satisfied. The recording section records the main calculation value, when the control section determines that the condition is satisfied. The recording section records the main calculation value obtained for a first period before the control section determines that the condition is satisfied. The recording section records the main calculation value obtained for a second period after the control section determines that the condition is satisfied. Further, the recording section records the safing calculation value obtained for the second period.

According to another aspect of the present disclosure, a data recording apparatus for a vehicle equipped with an occupant protection device includes a main sensor, a safing sensor, a temporary memory section, a control section, a recording section, and a comparing section. The main sensor detects acceleration of the vehicle in event of a crash. The safing sensor detects the acceleration. The temporary memory section stores a main calculation value and a safing calculation value for a predetermined period. The main calculation value is calculated from a detection result of the main sensor. The safing calculation value is calculated from a detection result of the safing sensor. The control section controls activation and deactivation of the occupant protection device based on the main calculation value and the safing calculation value. The control section determines whether a predetermined condition associated with the acceleration is satisfied. The recording section records the main calculation value upon determination of the control section that the condition is satisfied. The recording section records the main calculation value obtained for a first period before the control section determines that the condition is satisfied. The recording section records the main calculation value obtained for a second period after the control section determines that the condition is satisfied. The comparing section performs a comparison between the main calculation value obtained after the determination and the safing calculation value obtained after the determination. The comparing section generates reliability information indicative of reliability of the main calculation value based on the comparison and causes the recording section to record the reliability information.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure are described below with reference to the drawings. For example, the present disclosure can be embodied as an event data recorder (EDR) for an airbag electronic control unit (ECU) mounted on a vehicle.

First Embodiment

Figure 1:
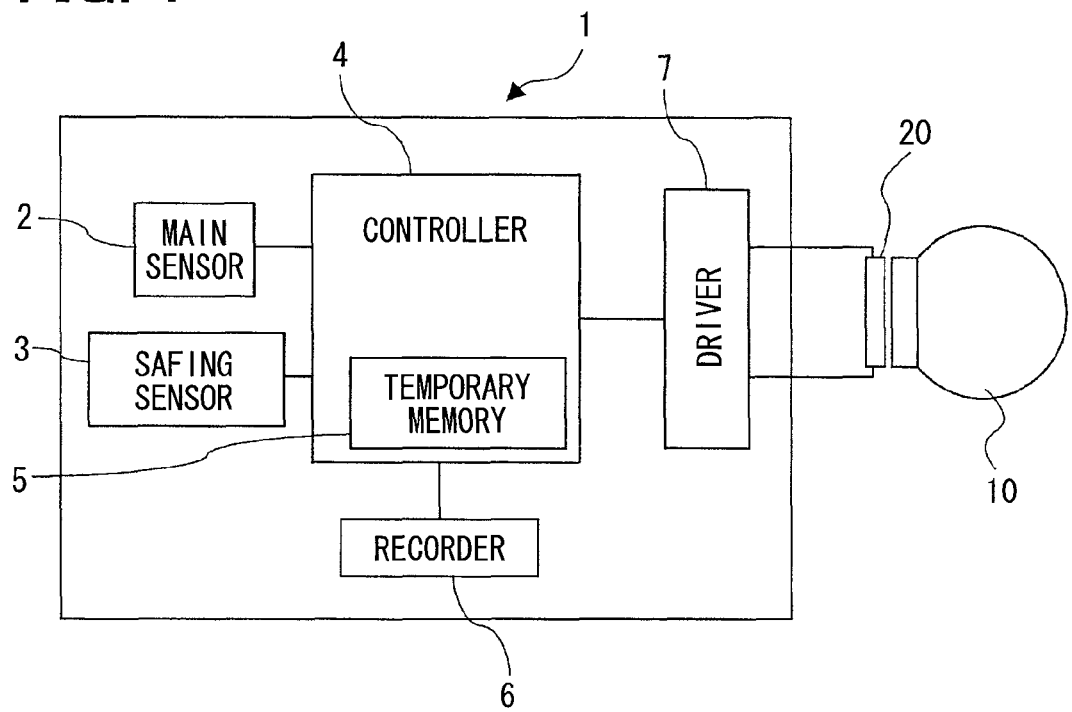
FIG. 1 is a block diagram of a data recording apparatus according to a first embodiment of the present disclosure.

A data recording apparatus 1 according to a first embodiment of the present disclosure is described below with reference to FIG. 1. The data recording apparatus 1 is an ECU mounted on a vehicle. As shown in FIG. 1, the data recording apparatus 1 includes a main sensor 2, a safing sensor 3, a controller 4, a temporary memory 5, a recorder 6, and a driver 7.

The main sensor 2 is an acceleration sensor (so-called "G sensor"). For example, the main sensor 2 can have a detection range from 50 G to 100 G. The safing sensor 3 is an acceleration sensor. A detection range of the safing sensor 3 is smaller than the detection range of the main sensor 2. For example, the detection range of the safing sensor 3 can be about 20 G.

The controller 4 has a calculating section such as a central processing unit (CPU). The controller 4 controls inflation and deflation of an airbag 10 based on detection results of the main sensor 2 and the safing sensor 3. Specifically, when the detection result of the safing sensor 3 exceeds a first predetermined value (hereinafter referred to as "safing threshold value"), the controller 4 prepares to inflate the airbag 10. And, when the detection result of the main sensor 2 exceeds a second predetermined value (hereinafter referred to as "main threshold value"), the controller 4 determines that an inflation condition for the inflation of the airbag 10 is satisfied and sends an inflation command to the driver 7. In response to the inflation command, the driver 7 inflates the airbag 10. The safing threshold value is smaller than the main threshold value. For example, the safing threshold value can be set to a deceleration (i.e., negative acceleration) of about 2 G.

According to the first embodiment, the inflation condition is satisfied when any one of the following two conditions (i) and (ii) is satisfied:

(i) A safing calculation value exceeds the safing threshold value, and a main calculation value exceeds the main threshold value.

(ii) A detection result of another sensor (e.g., satellite sensor) mounted on the vehicle exceeds a predetermined threshold value.

Further, when any one of the above two conditions (i) and (ii) is satisfied, a recoding condition for the start of the recording of vehicle information on the recorder 6 is satisfied. That is, when any one of the above two conditions (i) and (ii) is satisfied, the recorder 6 is triggered to start recording vehicle information. The safing calculation value and the main calculation value are described in detail later. It is noted that the recording condition can be different from the inflation condition. For example, when the inflation condition is the condition (i), the recording condition may be the condition (ii). The inflation condition and the recording condition are sometimes hereinafter collectively referred to as the "predetermined condition".

The controller 4 repeatedly calculates a velocity change amount $\Delta V$ from the detection results of the main sensor 2 and the safing sensor 3 at a predetermined time interval. That is, the controller 4 calculates the velocity change amount $\Delta V$ by sampling the detection results of the main sensor 2 and the safing sensor 3 at a predetermined sampling rate (e.g., 10 ms). The calculated velocity change amount $\Delta V$ is converted to digital data. The digital data, to which the velocity change amount $\Delta V$ calculated from the detection result of the main sensor 2 is converted, is defined as a main calculation value $\Delta Vm$. The digital data, to which the velocity change amount $\Delta V$ calculated from the detection result of the safing sensor 3 is converted, is defined as a safing calculation value $\Delta Vs$. The controller 4 controls inflation and deflation of the airbag 10 based on the sampled acceleration information (i.e., the main calculation value and the safing calculation value). The present acceleration of the vehicle can be calculated from the velocity change amount $\Delta V$. The controller 4 causes the temporary memory 5 to store the main calculation value $\Delta Vm$ and the safing calculation value $\Delta Vs$.

As shown in FIG. 1, the temporary memory 5 is incorporated in the controller 4. Alternatively, the temporary memory 5 can be located outside the controller 4. The temporary memory 5 stores the main calculation value $\Delta Vm$ and the safing calculation value $\Delta Vs$ obtained for a predetermined period from a predetermined time ago to the present time (i.e., now). Thus, multiple main calculation values $\Delta Vm$ and multiple safing calculation values $\Delta Vs$ are kept stored in the temporary memory 5. When the latest data is newly stored in the temporary memory 5, the oldest data is deleted from the temporary memory 5. The temporary memory 5 is a memory device capable of at least temporarily retaining stored data. For example, the temporary memory 5 can be a latch circuit or a volatile memory such as a cache memory.

Figure 2:
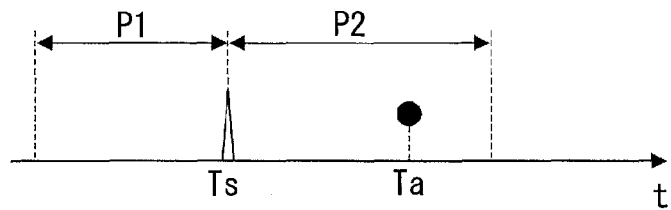
FIG. 2 is a diagram illustrating a period of time during which the data recording apparatus of FIG. 1 records data.

The recorder 6 is a non-volatile data storage device. For example, the recorder 6 can be an electrically erasable programmable read-only memory (EEPROM) or a flash memory incorporating a CPU. The recorder 6 records the main calculation value $\Delta Vm$ and the safing calculation value $\Delta Vs$ calculated around the time when the controller 6 determines that the predetermined condition (i.e., the inflation condition or the recording condition) is satisfied. Specifically, as shown in FIG. 2, when the controller 4 determines that the predetermined condition is satisfied at a time Ts, the controller 4 causes the recorder 6 to read the main calculation value $\Delta Vm$ and the safing calculation value $\Delta Vs$ from the temporary memory 5. Thus, upon determination of the controller 4 that the predetermined condition is satisfied, the recorder 6 records the main calculation value $\Delta Vm$ and the safing calculation value $\Delta Vs$ which are obtained for a first period P1 before the determination. Further, the controller 4 causes the recorder 6 to record the main calculation value $\Delta Vm$ and the safing calculation value $\Delta Vs$ which are obtained for a second period P2 after the determination. In addition to the acceleration information (i.e., the main calculation value $\Delta Vm$ and the safing calculation value $\Delta Vs$), the recorder 6 can record other vehicle information such as a vehicle speed, an engine RPM, and an ON/OFF state of an airbag warning lamp. It is noted that the time length of the first period P1 can be the same as or different from the time length of the second period P2.

The driver 7 is an integrated circuit (IC). The driver 7 ignites an airbag squib 20 in response to the inflation command from the controller 4. The airbag squib 20 has two switching elements connected in series. When both the switching elements are turned ON, the airbag 10 inflates. For example, when the safing calculation value $\Delta Vs$ exceeds the safing threshold value, the controller 4 can send a first inflation command to the driver 7 to turn ON one switching element of the airbag squib 20, and then when the main calculation value $\Delta Vm$ exceeds the main threshold value, the controller 4 can send a second inflation command to the driver 7 to turn ON the other switching element of the airbag squib 20.

An example of how the recorder 6 records vehicle information is described below with reference to FIG. 2. When the predetermined condition is satisfied at the time Ts, vehicle information (i.e., the main calculation value $\Delta Vm$, the safing calculation value ΔVs, the vehicle speed, . . . ) obtained for the first period P1 (e.g., for five seconds) before the time Ts is recorded on the recorder 6 from the temporary memory 5 (and another memory). Then, the vehicle information obtained for the second period P2 after the time Ts is recorded on the recorder 6. In FIG. 2, a time Ta is a time at which the airbag 10 inflates. As shown in FIG. 2, the time Ta is included in the second period P2. For example, the vehicle information recorded on the recorder 6 for the second period P2 can include a failure code appearing at the time Ts and a time length from the time Ts to the time Ta in addition to the main calculation value ΔVm and the safing calculation value ΔVs.

As described above, according to the first embodiment, the recorder 6 records both the main calculation value ΔVm and the safing calculation value ΔVs obtained around the time when the predetermined condition is satisfied. In such an approach, reliability of the acceleration information recorded on the recorder 6 can be easily checked in a later investigation of the crash by comparing the main calculation value ΔVm with the safing calculation value ΔVs. If the main calculation value ΔVm and the safing calculation value ΔVs, which are obtained for the second period P2 after the predetermined condition is satisfied, are identical to each other, it can be considered that reliability of the recorded acceleration information is high.

It is not always necessary to record the safing calculation value ΔVs obtained for the first period P1 before the predetermined condition is satisfied. A reason for this is that it is more important to the investigation of the crash to check the reliability of the main calculation value ΔVm obtained after the predetermined condition is satisfied than before the predetermined condition is satisfied. However, in order to surely check the reliability of the main calculation value ΔVm, it is preferable that the recorder 6 records the safing calculation value ΔVs obtained before and after the predetermined condition is satisfied.

As mentioned above, the recording condition can be different from the inflation condition. For example, the recording condition can be satisfied when the main calculation value ΔVm exceeds a predetermined threshold value smaller than the main threshold value.

Second Embodiment

A second embodiment of the present disclosure is described below. A difference between the first and second embodiments is as follows.

Like in the first embodiment, upon determination that a predetermined condition (i.e., the inflation condition or the recording condition) is satisfied, the controller 4 causes the recorder 6 to record the main calculation value ΔVm obtained for the first period P1 before the determination and the main calculation value ΔVm obtained for the second period P2 after the determination.

Unlike in the first embodiment, the controller 4 causes the recorder 6 to record reliability information instead of the safe calculation value ΔVs after the determination. The reliability information indicates reliability of the main calculation value ΔVm.

Specifically, the controller 4 performs a comparison between the main calculation value ΔVm and the safing calculation value ΔVs obtained for the second period P2 after the determination. Thus, the controller 4 can serve as a comparison section. Then, the controller 4 generates the reliability information based on a result of the comparison and records the reliability information on the recorder 6. For example, the reliability information can be a matching flag.

Specifically, after the controller 4 determines that the predetermined condition is satisfied, the controller 4 refers to the main calculation value ΔVm and the safing calculation value ΔVs and detects the maximum value of the main calculation value ΔVm and the maximum value of the safing calculation value ΔVs For example, the controller 4 detects the maximum value of the main calculation value ΔVm by detecting a point where a sign of the main calculation value ΔVm changes from a positive to a negative. Likewise, the controller 4 detects the maximum value of the safing calculation value ΔVs by detecting a point where a sign of the safing calculation value ΔVs changes from positive to negative. It is noted that each of the main calculation value ΔVm and the safing calculation value ΔVs has a positive value in a negative acceleration direction (i.e., in a deceleration direction).

Figure 3:
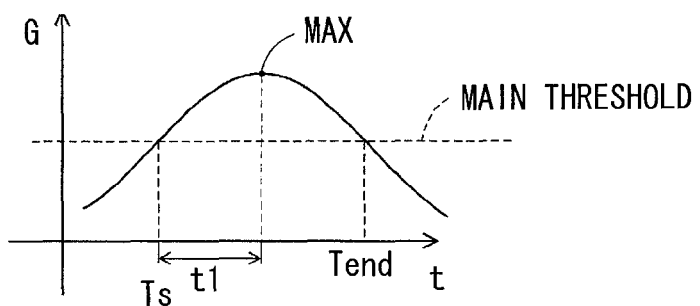
FIG. 3 is a diagram illustrating a change in acceleration over time in the event of a crash.

The controller 4 performs a comparison between the maximum value of the main calculation value ΔVm and the maximum value of the safing calculation value ΔVs. When a difference between the maximum value of the main calculation value ΔVm and the maximum value of the safing calculation value ΔVs in the comparison falls within a predetermined first range, the controller 4 records the matching flag on the recorder 6 (i.e., sets the matching flag in the recorder 6). The first range is set so that the matching flag can be recorded on the recorder 6 not only when the difference is exactly zero but also when the difference is almost zero. As shown in FIG. 3, when a vehicle crashes, the maximum value (MAX) of acceleration of the vehicle becomes large. Therefore, when the maximum values of the main calculation value ΔVm and the safing calculation value ΔVs are almost equal to each other, it can be considered that the main calculation value ΔVm and the safing calculation value ΔVs are almost totally equal to each other. Thus, the reliability of the recorded acceleration information (in particular, the main calculation value ΔVm) can be easily checked in a later investigation of the crash by checking whether the matching flag exists in the recorder 6. If the matching flag exists in the recorder 6, it can be considered that the recorded acceleration information is reliable and can be used in the investigation. In contrast, if the matching flag does not exist in the recorder 6, it can be considered that the recorded acceleration information is unreliable and cannot be used in the investigation.

Figure 4:
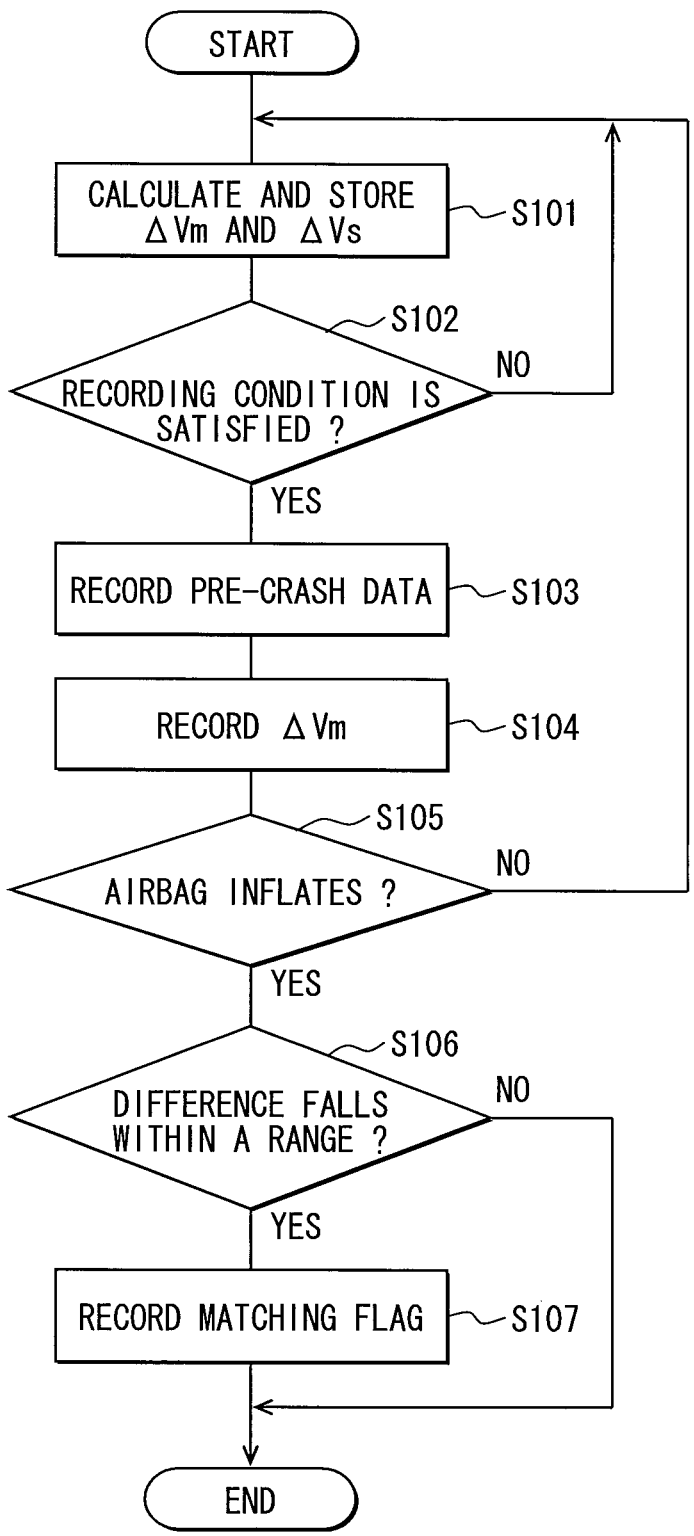
FIG. 4 is a diagram illustrating a flow chart of a recording process performed by a data recording apparatus according to a second embodiment of the present disclosure.

FIG. 4 is a flow chart of a recording process performed by the controller 4 according to the second embodiment. As shown in FIG. 4, the recording process starts at S101, where the controller 4 calculates the main calculation value ΔVm and the safing calculation value ΔVs by sampling the detections results of the main sensor 2 and the safing sensor 3 at a predetermined sampling rate. Further, at S101, the controller 4 causes the temporary memory 5 to sequentially store the main calculation value ΔVm and the safing calculation value ΔVs. Then, the recording process proceeds to S102, where the controller 4 determines whether the recording condition is satisfied based on the main calculation value ΔVm and the safing calculation value ΔVs. If the recording condition is not satisfied corresponding to NO at S102, the recording process returns to S101.

In contrast, if the recording condition is satisfied corresponding to YES at S102, the recording process proceeds to S103. At S103, the controller 4 causes the recorder 6 to record vehicle information (i.e., pre-crash data) obtained before the satisfaction of the recording condition. Further, at S103, the controller 4 causes the recorder 6 to record the main calculation value ΔVm, which is obtained for the first period P1 before the satisfaction, by reading the main calculation value ΔVm from the temporary memory 5. For example, the pre-crash data recorded at S103 can include a vehicle speed, an engine RPM, an ON/OFF state of an airbag warning lamp, and a failure code. Further, the controller 4 sends the inflation command to the driver 7 so that the airbag 10 can inflate a predetermined time after the satisfaction. Then, the recording process proceeds to S104, where the controller 4 causes the recorder 6 to sequentially record the main calculation value $\Delta Vm$ obtained for the second period P2 after the satisfaction.

Then, the recording process proceeds to S105, where the controller 4 determines whether the airbag 10 inflates. If the airbag 10 has not inflated yet corresponding to NO at S105, the recording process returns to S101. In contrast, if the airbag 10 has already inflated corresponding to YES at S105, the recording process proceeds to S106. At S106, the controller 4 performs a comparison between the maximum values of the main calculation value $\Delta Vm$ and the safing calculation value $\Delta Vs$ obtained for the second period P2 after the satisfaction. Further, at S106, the controller 4 determines whether the difference between the maximum values in the comparison falls within the first range. If the difference falls within the first range corresponding to YES at S106, the recording process proceeds to S107, where the controller 4 records the matching flag on the recorder 6. In contrast, if the difference falls outside the first range corresponding to NO at S106, the recording process is ended without recording the matching flag.

For example, the flowchart of FIG. 4 can be modified as follows. The recorder 6 can record the main calculation value $\Delta Vm$ even after the airbag 10 inflates. For example, as shown in FIG. 3, the recorder 6 can record the main calculation value $\Delta Vm$ until several tens of seconds have elapsed from a time Tend at which the main calculation value $\Delta Vm$ decreases below the main threshold value When the difference falls outside the first range corresponding to NO at S106, an average value (i.e., $(\Delta Vm+\Delta Vs)/2$) of the main calculation value $\Delta Vm$ and the safing calculation value $\Delta Vs$ obtained after the satisfaction can be recorded on the recorder 6. In this case, the main calculation value $\Delta Vm$ already recorded on the recorder 6 can be overwritten by the average value. Like the main calculation value $\Delta Vm$ recorded at S104, both the safing calculation value $\Delta Vs$ obtained for the first period P1 before the satisfaction and the safing calculation value $\Delta Vs$ obtained for the second period P2 after the satisfaction can be recorded on the recorder 6.

Figure 5:
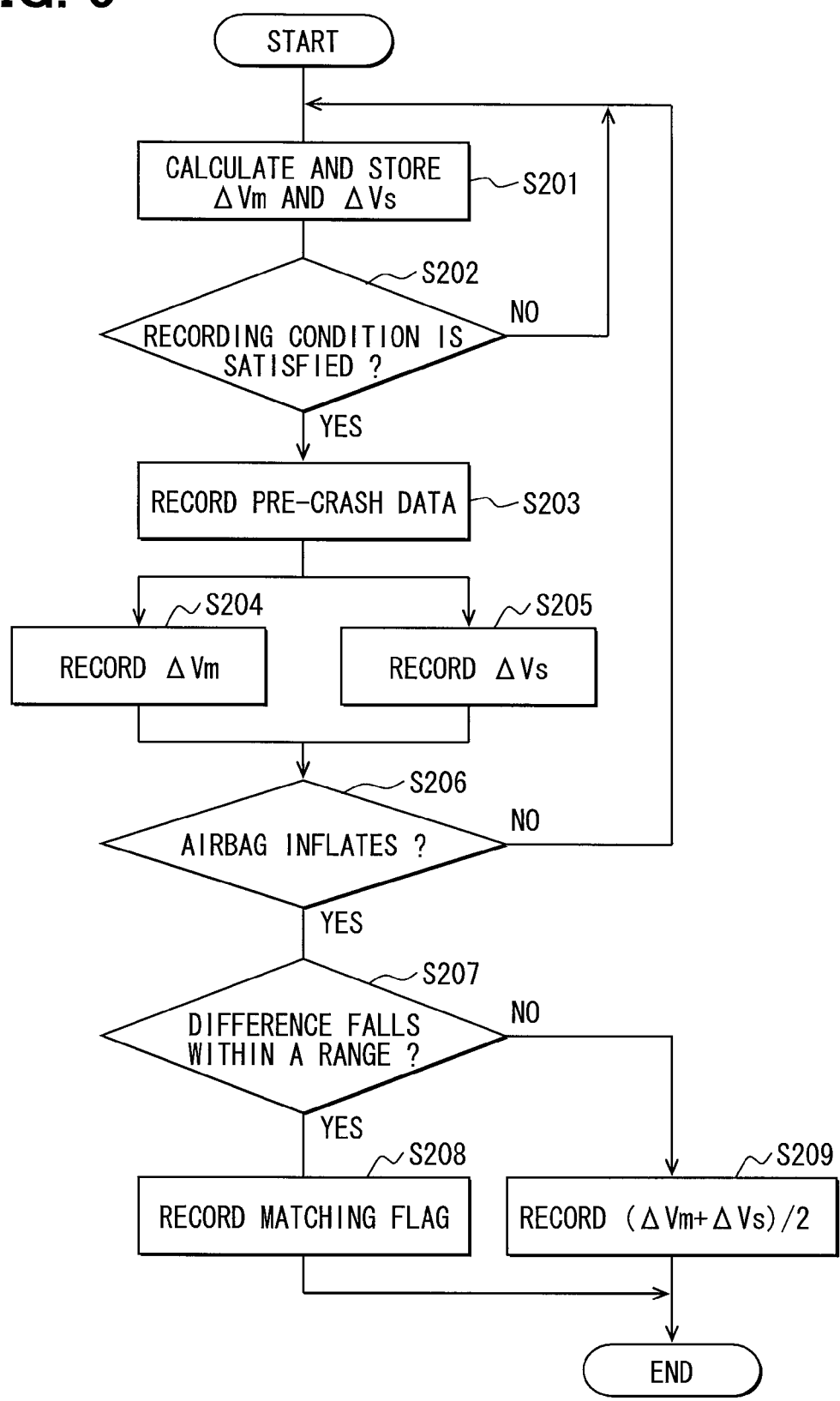
FIG. 5 is a diagram illustrating a flow chart of a recording process performed by a data recording apparatus according to a modification of the second embodiment.

FIG. 5 is a flow chart of a recording process performed by the controller 4 according to a modification of the second embodiment. S201-S204 of FIG. 5 correspond to S101-S104 of FIG. 4, respectively. S206-S208 of FIG. 5 correspond to S105-S107 of FIG. 4, respectively. At S205, the controller 4 causes the recorder 6 to record the safing calculation value $\Delta Vs$ obtained for the first period P1 before the satisfaction by reading the safing calculation value $\Delta Vs$ from the temporary memory 5. Further, at S205, the controller 4 causes the recorder 6 to sequentially record the safing calculation value $\Delta Vs$ obtained for the second period P2 after the determination. At S209, the controller 4 calculates the average value (i.e., $(\Delta Vm+\Delta Vs)/2$) of the main calculation value $\Delta Vm$ and the safing calculation value $\Delta Vs$ obtained after the satisfaction. Further, at S209, the controller 4 records the average value on the recorder 6.

Modifications

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

In the second embodiment, a flag setting condition for setting the matching flag in the recorder 6 is that the difference between the maximum values of the main calculation value $\Delta Vm$ and the safing calculation value $\Delta Vs$ in the comparison falls within the first range. The flag setting condition is not limited to that described in the second embodiment. For example, the controller 4 can perform a comparison between a first time t1 and a second time. As shown in FIG. 3, the first time t1 is taken for the main calculation value $\Delta Vm$ to reach its maximum value after determination of the controller 4 that the recording condition is satisfied. Although not shown in the drawing, the second time is taken for the safing calculation value $\Delta Vs$ to reach its maximum value after the determination. In this case, if a difference between the first time t1 and the second time in the comparison falls within a predetermined second range, the controller 4 can record the matching flag on the recorder 6 (i.e., set the matching flag in the recorder 6). Alternatively, the controller 4 can record the matching flag on the recorder 6, if the difference between the maximum values of the main calculation value $\Delta Vm$ and the safing calculation value $\Delta Vs$ in the comparison falls within the first range, and the difference between the first time t1 and the second time in the comparison falls within the second range.

The controller 4 can repeatedly perform a comparison between the main calculation value $\Delta Vm$ and the safing calculation value $\Delta Vs$ at a predetermined interval for a third period after determination of the controller 4 that the recording condition is satisfied. In this case, for example, the controller 4 can record the matching flag on the recorder 6, only when a difference between the main calculation value $\Delta Vm$ and the safing calculation value $\Delta Vs$ in every comparison (i.e., in all of the comparisons) performed during the third period falls within a predetermined range. Alternatively, the controller 4 can record the matching flag on the recorder 6, when the difference between the main calculation value $\Delta Vm$ and the safing calculation value $\Delta Vs$ in some of the comparisons performed during the third period falls within a predetermined range. The interval at which the controller 4 performs the comparison can be equal to the sampling rate. In order to improve reliability of the matching flag, the flag setting condition can be provided by combining the above described conditions.

Instead of the matching flag, the controller 4 can cause the recorder 6 to record matching degree information as the reliability information. For example, the controller 4 can perform a comparison between the main calculation value $\Delta Vm$ and the safing calculation value $\Delta Vs$ obtained for the second period P2 after determination of the controller 4 that the condition is satisfied and generate the matching degree information based on the comparison. The matching degree information indicates the degree of matching between the main calculation value $\Delta Vm$ and the safing calculation value $\Delta Vs$. For example, the matching degree information can exactly indicate the matching degree in such a manner that the main calculation value $\Delta Vm$ and the safing calculation value $\Delta Vs$ are 100% identical, 92% identical, or the like. Alternatively, the matching degree information can roughly indicate the matching degree in such a manner that the main calculation value $\Delta Vm$ and the safing calculation value $\Delta Vs$ are perfectly identical, almost identical, slightly identical, or not identical. The matching degree information can be a ratio of the safing calculation value $\Delta Vs$ to the main calculation value $\Delta Vm$.

Alternatively, the matching degree information can be a ratio of the main calculation value ΔVm to the safing calculation value ΔVs.

Further, the controller 4 can generate the matching degree information based on the comparison between the maximum values of the main calculation value ΔVm and the safing calculation value ΔVs obtained after determination of the controller 4 that the condition is satisfied. Further, the controller 4 can generate the matching degree information based on the comparison between the first time t1 and the second time. As mentioned previously, the first time t1 is taken for the main calculation value ΔVm to reach its maximum value after the determination, and the second time is taken for the safing calculation value ΔVs to reach its maximum value after the determination. In this case, the matching degree information indicates the degree of matching between the first time t1 and the second time.

Further, the controller 4 can repeatedly perform the comparison between the main calculation value ΔVm and the safing calculation value ΔVs at the predetermined interval for the third period after the determination and generate the matching degree information based on whether the difference between the main calculation value ΔVm and the safing calculation value ΔVs in every comparison falls within the predetermined range. In this case, the matching degree information can be a ratio of the number of times the difference falls within the predetermined range to the number of times the comparison is performed. In order to improve reliability of the matching degree information, the matching degree information can be generated by combining the above described methods.

In addition to the main calculation value ΔVm and the reliability information, the recorder 6 can record the safing calculation value ΔVs before and after the determination that the condition is satisfied. In this case, it is not always necessary the safing calculation value ΔVs after the determination is satisfied.

As mentioned previously, the detection range of the safing sensor 3 is smaller than the detection range of the main sensor 2. If the detection range of the safing sensor 3 is much smaller than the detection range of the main sensor 2, the above processes can be performed by using the safing calculation value ΔVs which is calculated before the safing sensor 3 is saturated. For example, the controller 4 can record the safing calculation value ΔVs on the recorder 6 after the determination until the saturation of the safing sensor 3 or can perform the comparison between the main calculation value ΔVm and the safing calculation value ΔVs after the determination until the saturation of the safing sensor 3.

When the difference between the main calculation value ΔVm and the safing calculation value ΔVs in the comparison falls outside the first range, the recorder 6 can record the average value of the main calculation value ΔVm and the safing calculation value ΔVs obtained for the second period P2 after the determination instead of recoding the main calculation value ΔVm and the safing calculation value ΔVs. In such an approach, even when the difference between the main calculation value ΔVm and the safing calculation value ΔVs is relatively large, the reliability of the recorded acceleration information can be improved. Further, since the amount of the acceleration information is reduced, the recorder 6 can have a reduced storage capacity.

In the embodiments, the main calculation value ΔVm and the safing calculation value ΔVs are digital data. Alternatively, the main calculation value ΔVm and the safing calculation value ΔVs can be analog data. Regardless of the result of the comparison between the main calculation value ΔVm and the safing calculation value ΔVs, the recorder 6 can record the maximum value of the main calculation value ΔVm obtained after the determination, the first time t1, or the time length from the time Ts to the time Ta.

What is claimed is:

1. A data recording apparatus for a vehicle equipped with an occupant protection device, the data recording apparatus comprising:
    a main sensor configured to detect acceleration of the vehicle in event of a crash;
    a safing sensor configured to detect the acceleration;
    a temporary memory section configured to store a main calculation value and a safing calculation value for a predetermined period, the main calculation value calculated from a detection result of the main sensor, the safing calculation value calculated from a detection result of the safing sensor;
    a control section configured to control activation and deactivation of the occupant protection device based on the main calculation value and the safing calculation value, the control section configured to determine whether a predetermined condition associated with the acceleration is satisfied;
    a recording section configured to record the main calculation value upon determination of the control section that the condition is satisfied, the recording section recording the main calculation value obtained for a first period before the determination and recording the main calculation value obtained for a second period after the determination, and
    a comparing section configured to perform a comparison between the main calculation value after the determination and the safing calculation value after the determination, wherein
    the comparing section generates reliability information indicative of reliability of the main calculation value based on the comparison and causes the recording section to record the reliability information.

2. The data recording apparatus according to claim 1, wherein
    each of the main calculation value the safing calculation value represents the amount of change in velocity of the vehicle, and
    the comparing section generates a matching flag as the reliability information, when a difference between a maximum value of the main calculation value and a maximum value of the safing calculation value in the comparison falls within a predetermined range.

3. The data recording apparatus according to claim 1, wherein
    each of the main calculation value the safing calculation value represents the amount of change in velocity of the vehicle,
    the comparing section generates a matching flag as the reliability information, when a difference between a first time and a second time in the comparison falls within a predetermined range,
    the first time is taken for the main calculation value to reach its maximum value after the determination, and
    the second time is taken for the safing calculation value to reach its maximum value after the determination.

4. The data recording apparatus according to claim 1, wherein
    each of the main calculation value the safing calculation value represents the amount of change in velocity of the vehicle, the comparing section repeatedly performs the comparison at a predetermined interval for a third period after the determination, and the comparing section generates a matching flag as the reliability information, when a difference between the main calculation value and the safing calculation value in every comparison falls within a predetermined range.

5. The data recording apparatus according to claim 1, wherein each of the main calculation value the safing calculation value represents the amount of change in velocity of the vehicle, the comparing section generates matching degree information as the reliability information, and the matching degree information represents a degree of matching between a maximum value of the main calculation value and a maximum value of the safing calculation value in the comparison.

6. The data recording apparatus according to claim 1, wherein each of the main calculation value the safing calculation value represents the amount of change in velocity of the vehicle, the comparing section generates matching degree information as the reliability information, the matching degree information represents a degree of matching between a first time and a second time in the comparison, the first time is taken for the main calculation value to reach its maximum value after the determination, and the second time is taken for the safing calculation value to reach its maximum value after the determination.

7. The data recording apparatus according to claim 1, wherein each of the main calculation value the safing calculation value represents the amount of change in velocity of the vehicle, the comparing section repeatedly performs the comparison at a predetermined interval for a third period after the determination, the comparing section generates a matching degree information as the reliability information based on whether a difference between the main calculation value and the safing calculation value in every comparison falls within a predetermined range, and the matching degree information represents a degree of matching between the main calculation value and the safing calculation value.

8. The data recording apparatus according to claim 1, wherein each of the main calculation value the safing calculation value represents the amount of change in velocity of the vehicle, the comparing section generates a matching flag as the reliability information, when a difference between a maximum value of the main calculation value and a maximum value of the safing calculation value in the comparison falls within a first range, and a difference between a first time and a second time in the comparison falls within a second range, the first time is taken for the main calculation value to reach its maximum value after the determination, and the second time is taken for the safing calculation value to reach its maximum value after the determination.

9. The data recording apparatus according to claim 2, wherein the reliability information includes at least one of the maximum value of the main calculation value and a time taken for the main calculation value to reach its maximum value after the determination.

* * * * *